(12) United States Patent
Johnson et al.

(10) Patent No.: US 8,667,843 B2
(45) Date of Patent: Mar. 11, 2014

(54) RESONANCE TESTING APPARATUS AND ARTICULATION ASSEMBLY

(75) Inventors: Jon Johnson, Sheffield (GB); Graham Morley, South Yorkshire (GB)

(73) Assignee: Johnson & Allen Ltd., Sheffield (GB)

( * ) Notice: Subject to any disclaimer, the term of this patent is extended or adjusted under 35 U.S.C. 154(b) by 275 days.

(21) Appl. No.: 13/094,956

(22) Filed: Apr. 27, 2011

(65) Prior Publication Data
US 2012/0042730 A1 Feb. 23, 2012

(30) Foreign Application Priority Data
Aug. 18, 2010 (GB) .................................. 101 38 190

(51) Int. Cl.
*G01M 7/02* (2006.01)
*G01H 13/00* (2006.01)

(52) U.S. Cl.
USPC ................................. 73/579; 73/663; 446/126

(58) Field of Classification Search
USPC ........... 73/579, 580, 581, 582, 583, 662, 663, 73/667, 668; 446/126
See application file for complete search history.

(56) References Cited

U.S. PATENT DOCUMENTS

| 409,744 | A | * | 8/1889 | Garben | 446/104 |
| 3,122,664 | A | * | 2/1964 | Loeb | 310/23 |
| 3,648,404 | A | * | 3/1972 | Ogsbury et al. | 446/126 |
| 4,170,425 | A | * | 10/1979 | Brown | 403/296 |
| 4,685,649 | A | * | 8/1987 | McKay | 248/594 |
| 6,264,522 | B1 | * | 7/2001 | Dickson | 446/120 |
| 8,365,598 | B2 | * | 2/2013 | Menten et al. | 73/579 |

FOREIGN PATENT DOCUMENTS

JP 60015538 A * 1/1985

* cited by examiner

*Primary Examiner* — Peter Macchiarolo
*Assistant Examiner* — Rose M Miller
(74) *Attorney, Agent, or Firm* — Gifford, Krass, Sprinkle, Anderson & Citkowski, P.C.

(57) ABSTRACT

A resonance testing apparatus has a plurality of arms for supporting a workpiece. At least one of said arms incorporates an articulation assembly having: a strut, a joint element which is movable in response to movement of the strut, and a clamp arrangement for clamping the joint element. The assembly has a first condition in which the joint element is movable and a second condition in which the clamp arrangement acts on the joint element to damp or restrict movement of the strut. The assembly includes a seating for the joint element, and a biasing arrangement for the seating. The assembly has a first condition in which the joint element is arranged on the seating and is movable on the seating and a second condition in which the biasing arrangement acts on the seating to damp or restrict movement of the joint element on the seating.

14 Claims, 2 Drawing Sheets

RESONANCE TESTING APPARATUS AND ARTICULATION ASSEMBLY

The present invention relates to resonance testing apparatus and to an articulation assembly of the kind suitable for use in resonance testing apparatus.

A known resonance testing apparatus consists of a plurality of supports arms, the distal ends of which can be arranged to provide a cradle for a workpiece for the purpose of a testing operation. However, the relative position of the arms may need to be changed to accommodate different shapes and configurations of workpiece.

There is a need to provide an apparatus for use in resonance testing which is readily reconfigurable to accommodate different shapes and configurations of workpiece.

According to a first aspect, there is provided an articulation assembly having a strut, a joint element which is movable in response to movement of the strut, and a clamp arrangement for clamping the joint element, wherein the articulation assembly has a first condition in which the joint element is substantially free for movement and a second condition in which the clamp arrangement acts on the joint element to damp or restrict movement of the strut.

This aspect provides a convenient assembly for use in a reconfigurable apparatus for resonance testing. e.g. wherein the strut forms part of a support structure for a workpiece under test. Advantageously, the position of the strut can be locked or damped against movement when the assembly is in the second condition (e.g. for a resonance testing operation), whereas the position of the strut can be readily articulated to one of a plurality of a different positions when the assembly is in the first condition (e.g. for accommodating a different workpiece).

In exemplary embodiments, the strut is locked against movement when the assembly is in the second condition, e.g. for a resonance testing operation.

In exemplary embodiments, the strut extends from the joint element and may be connected to or integral with the joint element.

In exemplary embodiments, the clamp arrangement consists of opposing clamp members, and the joint element is located between the opposing clamp members.

In exemplary embodiments, the biasing arrangement is provided to cause the joint element to be clamped between the opposing clamp members.

In exemplary embodiments, the biasing arrangement includes a movable piston, and movement of the piston in a first direction causes the joint element to be clamped between the opposing clamp members. In exemplary embodiments, the piston is sealingly mounted in a cylinder arranged for communication with an hydraulic pressure source. In alternative embodiments, the piston may be movable in an apply direction response to pneumatic pressure, or in response to a linear actuator (e.g. an electric or electromagnetic linear actuator). The piston may be spring-biased in an apply direction in the cylinder, in order to provide a residual clamping force on the joint element.

In exemplary embodiments, the clamp arrangement provides a seating for supporting the joint element. The seating may be configured to permit movement of the joint element when the assembly is in the first condition.

In exemplary embodiments, the joint element is of metal construction and the seating is of plastics or resin material, for reducing wear between the joint element and the seating.

In exemplary embodiments, the joint element is spherical or substantially spherical. The joint element may be an elongate roller element of circular cross-section.

In exemplary embodiments, one of the clamp members defines a ring having an aperture through which the strut extends to the joint element.

The joint element, clamp members and piston may be mounted in a housing having an upper end and a lower end. In exemplary embodiments, the strut extends from the upper end of the housing. In exemplary embodiments, the lower end of the housing includes a recess for securably receiving the end of a strut from another articulation assembly of the same kind and configuration, for connecting a pair of such articulation assemblies together.

According to a second aspect, there is provided an articulation assembly, the articulation assembly including a joint element, a seating for the joint element, and a biasing arrangement for the seating, wherein the articulation assembly has a first condition in which the joint element is arranged on the seating and is substantially free for movement on the seating and a second condition in which the biasing arrangement acts on the seating to damp or restrict movement of the joint element on the seating.

This aspect provides a convenient assembly for use in a reconfigurable resonance testing apparatus. e.g. wherein a strut forming part of a support structure for a workpiece is connected to or integral with the joint element. Advantageously, the position of the is connected to or integral with the joint element (and, hence, the position of the strut) strut can be locked or damped against movement when the assembly is in the second condition (e.g. for a resonance testing operation on a workpiece supported by the strut), and can be articulated to one of a plurality of a different positions when the assembly is in the first condition (e.g. for accommodating a new workpiece).

In exemplary embodiments, the joint element is locked against movement when the assembly is in the second condition, e.g. for a resonance testing operation.

In exemplary embodiments, the articulation assembly includes a strut or stud extending from the joint element and the joint element is movable in response to movement of the strut or stud when the assembly is in the first condition, whereas the strut is damped or restricted against movement when the assembly is in the second condition. In exemplary embodiments, the strut is locked against movement when the assembly is in the second condition.

In exemplary embodiments, the seating consists of opposing clamp members and the joint element is located between the opposing clamp members. Preferably, the biasing arrangement is arranged to cause the joint element to be clamped between the opposing clamp members.

In one example, one of the clamp members defines a ring having an aperture through which the strut extends to the joint element.

In exemplary embodiments, the clamp arrangement provides a seating for supporting the joint element and permitting movement of the joint element when the assembly is in the first condition.

In exemplary embodiments, the joint element is of metal construction and the seating is of plastics or resin material, for reducing wear between the joint element and the seating.

In exemplary embodiments, the biasing arrangement includes a movable piston, and movement of the piston in a first direction causes the joint element to be clamped between the opposing clamp members. In exemplary embodiments, the piston is sealingly mounted in a cylinder arranged for communication with an hydraulic pressure source. In alternative embodiments, the piston may be movable in an apply direction response to pneumatic pressure, or in response to a linear actuator (e.g. an electric or electromagnetic linear actuator). The piston may be spring-biased in an apply direction in the cylinder, in order to provide a residual clamping force on the joint element.

In exemplary embodiments, the joint element is spherical or substantially spherical. The joint element may be an elongate roller element of circular cross-section.

The joint element, clamp members and piston may be mounted in a housing having an upper end and a lower end. In exemplary embodiments, the strut extends from the upper end of the housing. In exemplary embodiments, the lower end of the housing includes a recess for securably receiving the end of a strut from another articulation assembly of the same kind and configuration, for connecting a pair of such articulation assemblies together.

According to another aspect, there is provided a resonance testing apparatus having a plurality of arms configurable to support a workpiece for a resonance testing operation, wherein at least one of said arms incorporates an articulation assembly having: a strut, a joint element which is movable in response to movement of the strut, and a clamp arrangement for clamping the joint element, wherein the articulation assembly has a first condition in which the joint element is movable for reconfiguration of the arm and a second condition in which the clamp arrangement acts on the joint element to damp or restrict movement of the strut for a resonance testing operation.

In exemplary embodiments, one or more of the arms includes a resonance testing transducer for contact with the workpiece during testing.

In exemplary embodiments, the articulation assembly consists of an articulation assembly in accordance with the first or second aspects set out above.

According to a further aspect, there is provided a resonance testing apparatus having a plurality of arms configurable to support a workpiece for a resonance testing operation, wherein at least one of said arms incorporates an articulation assembly having: a joint element, a seating for the joint element, and a biasing arrangement for the seating, wherein the articulation assembly has a first condition in which the joint element is arranged on the seating and is movable on the seating for reconfiguration of the arm and a second condition in which the biasing arrangement acts on the seating to damp or restrict movement of the joint element on the seating to damp or restrict movement of the strut for a resonance testing operation.

In exemplary embodiments, one or more of the arms includes a resonance testing transducer for contact with the workpiece during testing.

In exemplary embodiments, the articulation assembly consists of an articulation assembly in accordance with the first or second aspects set out above.

According to a yet further aspect, there is provided a resonance testing apparatus having a plurality of arms configurable to support or contact a workpiece for a resonance testing operation, wherein at least one of said arms incorporates a plurality of hydraulic locking ball joints for permitting selective configuration of said arm relative to the other arms, the apparatus having a first condition in which the application of hydraulic pressure locks the ball joints against movement for a resonance testing operation and a second condition in which the release or absence of hydraulic pressure permits the ball joints to move for permitting re-configuration of said arm relative to the other arms.

In exemplary embodiments, one or more of the arms includes a resonance testing transducer for contact with the workpiece during testing.

In exemplary embodiments, at least two of said arms incorporate first and second hydraulic locking ball joints coupled in series, and the apparatus is configured so that the first hydraulic locking ball joints can be locked simultaneously, prior to locking of the second ball joints. In exemplary embodiments, each arm includes a third ball joint coupled in series to the second ball joint, and the apparatus is configured so that third ball joints can be locked simultaneously, after locking of the second ball joints.

In exemplary embodiments, each hydraulic locking ball joint consists of an articulation assembly in accordance with the first or second aspects set out above.

According to a further aspect, there is provided a resonance testing method, the resonance testing method comprising the steps of: providing a plurality of arms for contacting or supporting a workpiece for a resonance testing operation, arranging said plurality of arms in a first configuration relative to one another to contact or support a workpiece for a resonance testing operation, conducting a resonance testing operation on a workpiece contacted or supported by the arms in said first configuration; and reconfiguring the position of the arms relative to one another for the purpose of another resonance testing operation; wherein at least one of said arms incorporates one or more hydraulically-lockable articulation assemblies for permitting selective configuration of said at least one arm relative to the other arms in said plurality of arms.

In exemplary embodiments, at least two of said arms incorporate multiple hydraulically-lockable articulation assemblies coupled to one another in series, wherein the method includes the step of simultaneously locking the lowermost articulation assembly in each or said arms, prior to locking the next level of articulation assembly in each arm.

In exemplary embodiments, one or more of the arms includes a resonance testing transducer for contact with the workpiece during testing.

In exemplary embodiments, each hydraulically-lockable articulation assembly consists of an articulation assembly in accordance with the first or second aspects set out above.

Other aspects and features will be apparent from the appended claims and from the following description of exemplary embodiments, made by way of example only, with respect to the accompanying drawings, in which:

Figure 1:
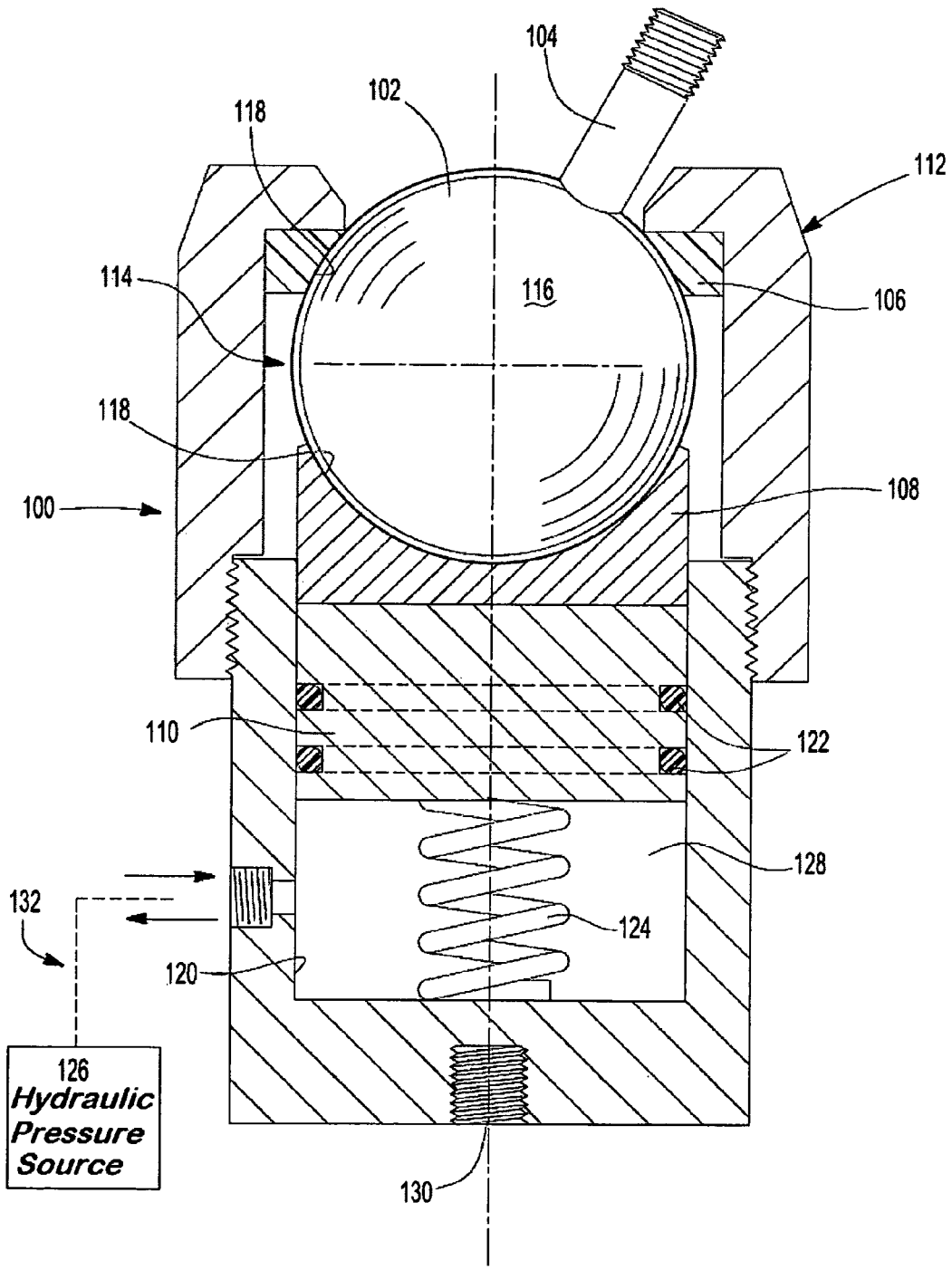
FIG. 1 is a schematic cross-sectional view of an hydraulically lockable articulation assembly.

Referring firstly to FIG. 1, an articulation is indicated generally at 100. The assembly 100 includes a joint element 102 having an integral strut 104. The joint element 102 is arranged for movement between opposing parts 106, 108. A piston 110 is movable to clamp the joint element 102 between the opposing parts 106, 108, in order to damp or restrict movement of the strut 104.

The opposing parts 106, 108 define a seating 114 in which the joint element 102 is movable (i.e. when the piston 110 is in a release position). In this embodiment, the joint element 102 is in the form of a ball element 116, permitting three degrees of freedom. The opposing parts 106, 108 have complimentary curved surfaces 118 between which the ball element 116 is rotatable. Hence, the assembly 100 is a form of ball joint.

In other embodiments, the joint element 102 may take the form of an elongate roller element (not shown), in which case the seating parts may be configured for permitting only a single degree of freedom (about one axis).

In this embodiment, the ball element 116 is of metal construction and the seating parts 106, 108 are of plastics or resin material, for reducing wear of the metal ball element 116.

The upper most seating part 106 (as viewed in FIG. 1) is in the form of a ring, and the strut 104 extends through the ring.

The piston 110 is movable in a cylinder 120 arranged for communication with an hydraulic pressure source (indicated at 126) via an hydraulic circuit (indicated by dotted lines 132. The piston 110 is sealingly mounted in the cylinder 120 using o-ring seals 122, to prevent the egress of hydraulic fluid 128 towards the ball 116.

Other embodiments may be mechanically actuated, e.g. using an electric or electromagnetic linear actuator to drive the piston, or could be coupled to a pneumatic pressure source for driving the piston. However, an hydraulic system is envisaged (without limitation) for resonance testing applications.

The piston 110 is arranged to act on the lower of said seating parts 108, in order to clamp the ball element 116 against the upper of said seating parts 108. Hence, the opposing parts 106, 108 serve as a clamp arrangement for the joint element 102.

A spring 124 acts to bias the piston 110 in an apply direction in the cylinder 120, in order to provide a residual clamping force on the ball 116.

The ball 116 and seating parts 106, 108 are mounted in a housing 112. In this embodiment, the housing 112 has a longitudinal axis indicated at 134 and the piston 110 is concentric with that axis. In this illustrated embodiment, the upper seating part 106 is arranged at one end of the housing 112 and the piston 110 is arranged at an opposite end of the housing 112 (lowermost as viewed in FIG. 1). The strut 104 extends from the housing 112.

In use, the piston 110 is driven against the lowermost seating part 108, whereby the ball 116 is clamped against the uppermost seating part 106. Dependent upon the applied force, the strut 104 will be locked or damped against movement. However, in the absence of an applied force (or at a low applied force, e.g. from the spring 124) the ball is substantially free for movement in its seating, e.g. to allow for re-positioning of the strut 104.

In exemplary embodiments, an hydraulic (or pneumatic) system provides for locking the position of the strut against movement, e.g. for a resonance testing operation. In other embodiments, an hydraulic (or pneumatic) system provides for variable damping of strut movement, e.g. by adjusting or releasing the applied pressure via the circuit 132.

Figure 2:
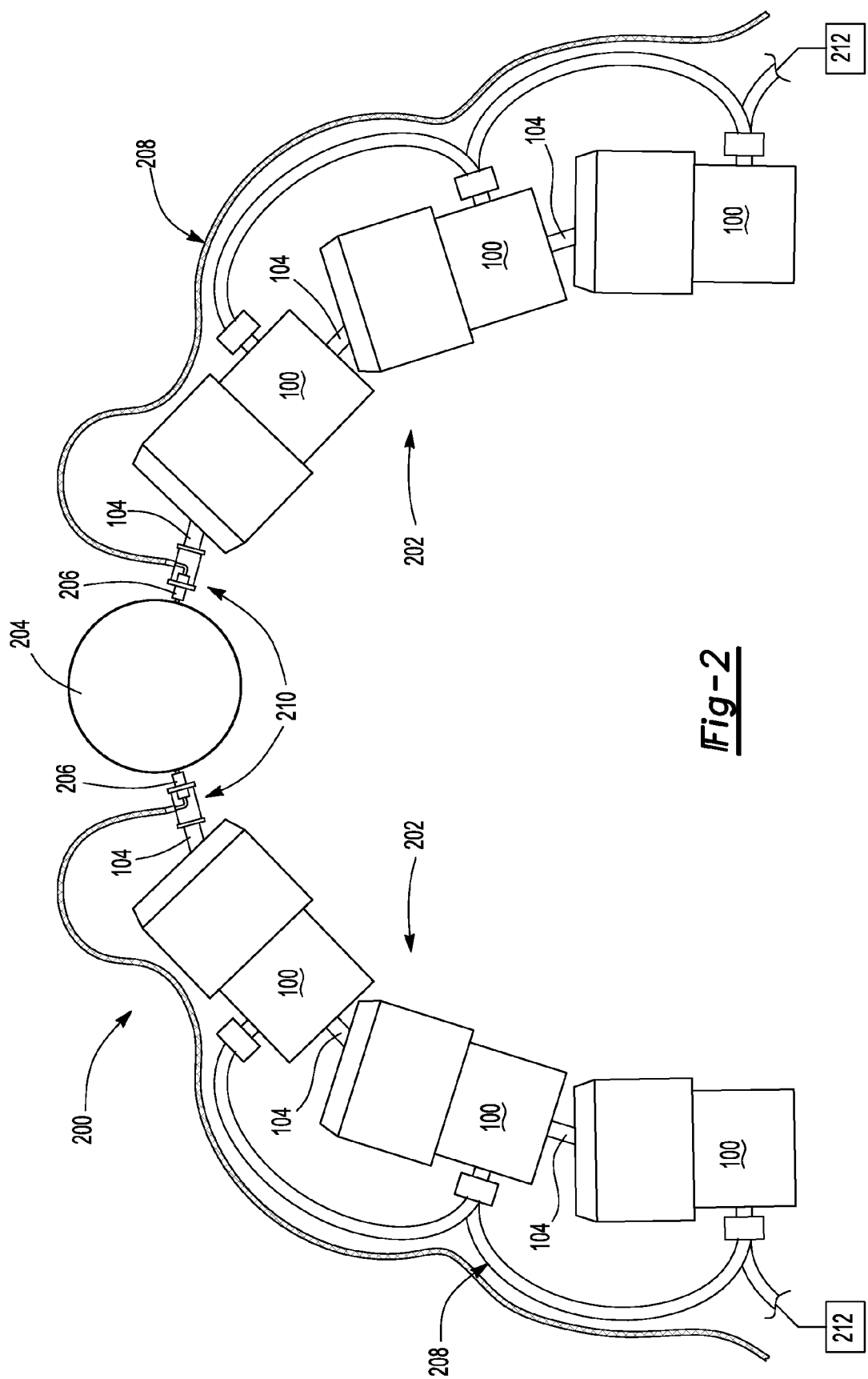
FIG. 2 is a schematic view from the side of a resonance testing arrangement incorporating a plurality of the articulation assemblies of FIG. 1.

The lower end of the housing 112 includes a recess 130 for securely receiving the end 128 of a strut 104 on another articulation assembly of the same kind and configuration, for connecting a pair of such articulation assemblies together in series (e.g. see FIG. 2). This may be by virtue of a threaded connection between the recess 130 and the end of the strut 104, for example.

FIG. 2 shows an example of a re-configurable support apparatus 200 suitable for resonance testing purposes. The apparatus 200 consists of multiple arms 202 (only two of which are shown) used to contact or support a workpiece 204 for a resonance testing operation.

Each arm 202 is made up of multiple articulation assemblies 100 of the kind shown in FIG. 1. For each arm 202, the articulation assemblies 100 are connected end to end, e.g. with the strut 104 on a first articulation assembly 100 engaged in a recess on the underside of a second first articulation assembly 100.

Each arm 202 has a distal end 210 with a resonance testing transducer 206, e.g. connected to or supported by the strut 104 of the upper most articulation assembly 100. The arms 202 are configurable so that the transducers 206 define a cradle for supporting or contacting the workpiece 204.

In exemplary embodiments, the apparatus 200 has three or more of said arms 202.

Each arm 202 has its own hydraulic supply line 208, for locking/releasing the articulation assemblies 100. In exemplary embodiments, the articulation assemblies 100 in each arm 202 are connected in series, in communication with a hydraulic source 212, via their respective supply line 208.

The position of each arm 202 can be locked against movement, e.g. via the application of hydraulic pressure through the supply line 208, since this activates the pistons to clamp the respective balls 116 and so prevent movement of the struts 104. When the pressure is released, the relative position of the arms 202 can be re-configured (e.g. to accommodate a different workpiece), since the balls 116 and, hence, the struts 104 will be movable. In exemplary embodiments, the hydraulic circuit is configured to permit independent locking/releasing of an individual articulation assembly in the apparatus 200.

In a further exemplary embodiment, the apparatus 200 has multiple arms 202, wherein each arm 202 includes two or more of said articulation assemblies 100. The apparatus 200 is configured so that the lowermost articulation assemblies 100 can be locked/released simultaneously, e.g. independently of the other articulation assemblies in the apparatus, via the hydraulic circuit 132. Similarly, the apparatus 200 is configured so that the next level of articulation assemblies 100 (i.e. above the lowermost articulation assemblies 100) can be locked/released simultaneously, e.g. independently of the lowermost articulation assemblies 100 and any other articulation assemblies 100 in the apparatus 200, via the hydraulic circuit 132. This enables a step-wise configuration of the apparatus 200, in which the position of a first level of articulation assemblies 100 can be simultaneously locked prior to locking of the next level of articulation assemblies 100 and so on to the uppermost level of articulation assemblies 100 in the arms 202.

The invention claimed is:

1. A resonance testing apparatus having a plurality of arms configurable for contacting or supporting a workpiece for a resonance testing operation, wherein at least one of said arms incorporates an articulation assembly having: a strut, a joint element which is movable in response to movement of the strut, and a clamp arrangement for clamping the joint element, wherein the articulation assembly has a first condition in which the joint element is movable for reconfiguration of the arm and a second condition in which the clamp arrangement acts on the joint element to damp or restrict movement of the strut for a resonance testing operation.

2. A resonance testing apparatus according to claim 1, wherein the clamp arrangement consists of opposing clamp members and the joint element is located between the opposing clamp members.

3. A resonance testing apparatus according to claim 2, further including a biasing arrangement configured to activate the clamp arrangement and cause the joint element to be clamped between the opposing clamp members, for locking the joint element against movement.

4. A resonance testing apparatus according to claim 3 wherein the biasing arrangement includes a movable piston, and movement of the piston in a first direction causes the joint element to be clamped between the opposing clamp members.

5. A resonance testing apparatus according to claim 4 wherein the piston is sealingly mounted in a cylinder arranged for communication with an hydraulic or pneumatic pressure source.

6. A resonance testing apparatus according to claim 4 wherein the piston is spring-biased in an apply direction in the cylinder.

7. A resonance testing apparatus according to claim 2 wherein at least one of said clamp members acts as a seating for the joint element during movement of the joint element.

8. A resonance testing apparatus according to claim 1 wherein the joint element is spherical and is mounted in a seating configured to allow for movement in three dimensions.

9. A resonance testing apparatus according to claim 8 wherein the joint element is of metal construction and the seating is of plastics or resin material.

10. A resonance testing apparatus according to claim 1 wherein the strut is integral with or connected to the joint element.

11. A resonance testing apparatus according to claim 10 wherein the strut extends through the clamp arrangement.

12. A resonance testing apparatus according to claim 11 wherein the clamp arrangement includes a ring member having an aperture through which the strut extends to the joint element.

13. A resonance testing apparatus according to claim 4 wherein the joint element, clamp members and piston are mounted in a housing having an upper end and a lower end and wherein the strut extends from the upper end of the housing.

14. A resonance testing apparatus according to claim 13 wherein the lower end of the housing includes a recess for securably receiving the end of a strut from another articulation assembly of the same kind and configuration, and wherein said arm includes at least two interconnected articulation assemblies.

* * * * *

UNITED STATES PATENT AND TRADEMARK OFFICE
CERTIFICATE OF CORRECTION

| | | |
|---|---|---|
| PATENT NO. | : 8,667,843 B2 | Page 1 of 2 |
| APPLICATION NO. | : 13/094956 | |
| DATED | : March 11, 2014 | |
| INVENTOR(S) | : Jon Johnson et al. | |

It is certified that error appears in the above-identified patent and that said Letters Patent is hereby corrected as shown below:

On the Title Page:

Item (30) Foreign Application Priority Data

Delete "101 38 190", Insert --1013819.6--

In the Specification:

At column 1, line number 25, Delete "testing.", Insert --testing,--

At column 1, line number 31, Before different, Delete "a"

At column 1, line number 51, Delete "an", Insert --a--

At column 1, line number 52, Delete "apply", Insert --applied--

At column 1, line number 55, Delete "apply", Insert --applied--

At column 2, line number 25, Delete "of the"

At column 2, line number 26, Before can, Delete "strut"

At column 2, line number 30, Before different, Delete "a"

At column 2, line number 64, Delete "an", Insert --a--

At column 2, line number 65, Delete "apply", Insert --applied--

Signed and Sealed this
Twelfth Day of May, 2015

Michelle K. Lee
*Director of the United States Patent and Trademark Office*

CERTIFICATE OF CORRECTION (continued)
U.S. Pat. No. 8,667,843 B2

At column 3, line number 1, Delete "apply", Insert --applied--

At column 3, line number 5, Delete "elongate", Insert --elongated--

At column 4, line number 44, Delete "an", Insert --a--

At column 4, line number 65, Delete "elongate", Insert --elongated--

At column 5, line number 7, Delete "an", Insert --a--

At column 5, line number 8, Delete "an", Insert --a--

At column 5, line number 15, Delete "an", Insert --a--

At column 5, line number 22, Delete "apply", Insert --applied--

At column 5, line number 41, Delete "an", Insert --a--

At column 5, line number 44, Delete "an", Insert --a--

At column 6, line number 13, Delete "so", Insert --to--

In the Claims:

At column 6, claim number 5, line number 66, Delete "an", Insert --a--

At column 7, claim number 6, line number 2, Delete "apply", Insert --applied--